United States Patent [19]
Lloyd et al.

[11] Patent Number: 5,129,613
[45] Date of Patent: Jul. 14, 1992

[54] FIXTURE FOR ATTACHING CONTACT MATERIAL

[75] Inventors: Patrick H. Lloyd, Denton; Larry J. Wallace, Decatur; Jeffrey L. Kopel, Henrietta; Billy B. Arrington, Bridgeport, all of Tex.

[73] Assignee: Union Oil Company of California, Los Angeles, Calif.

[21] Appl. No.: 330,222

[22] Filed: Mar. 29, 1989

[51] Int. Cl.⁵ .............................................. F16B 2/00
[52] U.S. Cl. ............................. 248/221.3; 248/224.1; 248/225.1
[58] Field of Search ................. 248/146, 224.1, 223.4, 248/221.3, 300, 224.2, 225.1

[56] References Cited

U.S. PATENT DOCUMENTS

| | | | |
|---|---|---|---|
| 965,658 | 7/1910 | Reubel | 248/223.4 X |
| 1,720,309 | 7/1929 | Wakefield | 248/223.4 X |
| 2,463,110 | 3/1949 | Johnson | 248/224.2 X |
| 2,773,473 | 12/1956 | Martin | 248/224.2 X |
| 3,074,680 | 1/1963 | Stewart | 248/223.4 X |
| 3,131,251 | 4/1964 | Ryan | 248/224.1 X |
| 4,332,052 | 6/1982 | Remington | 248/225.1 X |

FOREIGN PATENT DOCUMENTS

| | | | |
|---|---|---|---|
| 2422369 | 12/1979 | France | 248/224.1 |
| 54439 | 6/1921 | Sweden | 248/224.1 |

*Primary Examiner*—Alvin C. Chin-Shue
*Attorney, Agent, or Firm*—Clark E. De Larvin; Gregory F. Wirzbicki; Michael A. Kondzella

[57] ABSTRACT

A fixture for holding a piece of contact material utilizes inwardly facing channels for receiving the contact materials and resilient projections on the base of the fixture to hold the contact material within the channels.

11 Claims, 1 Drawing Sheet

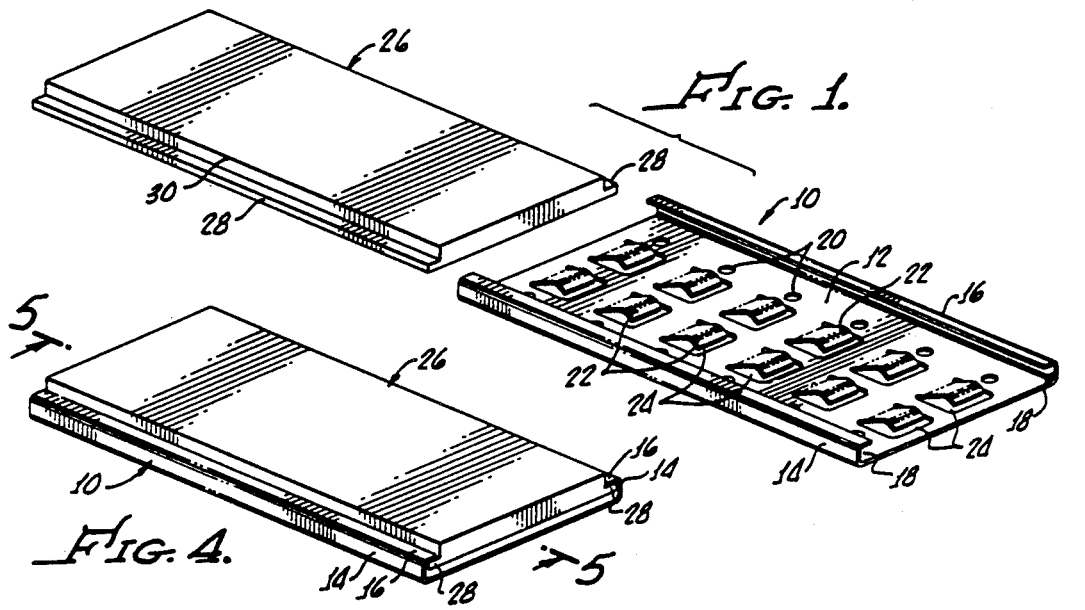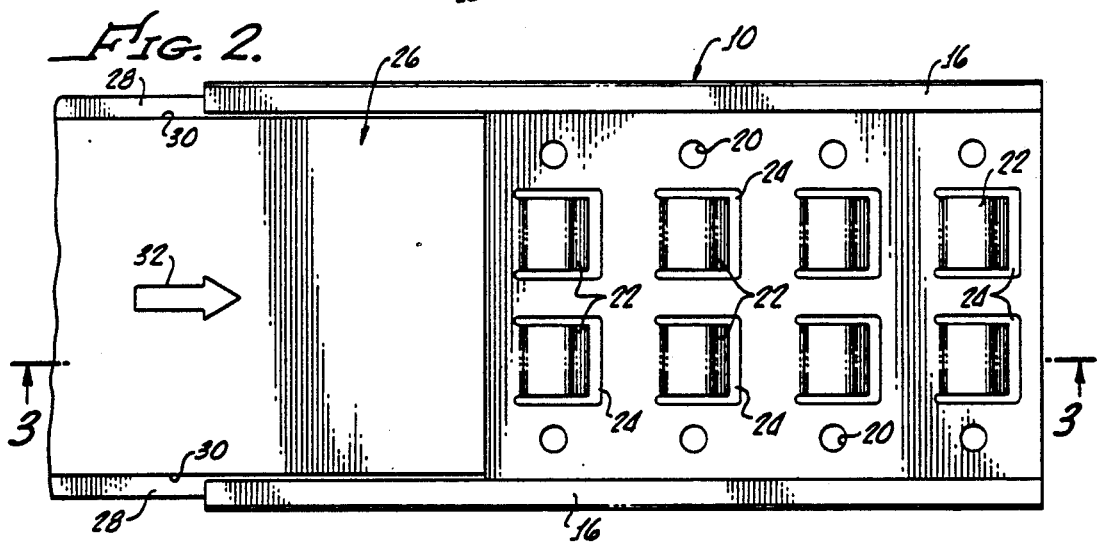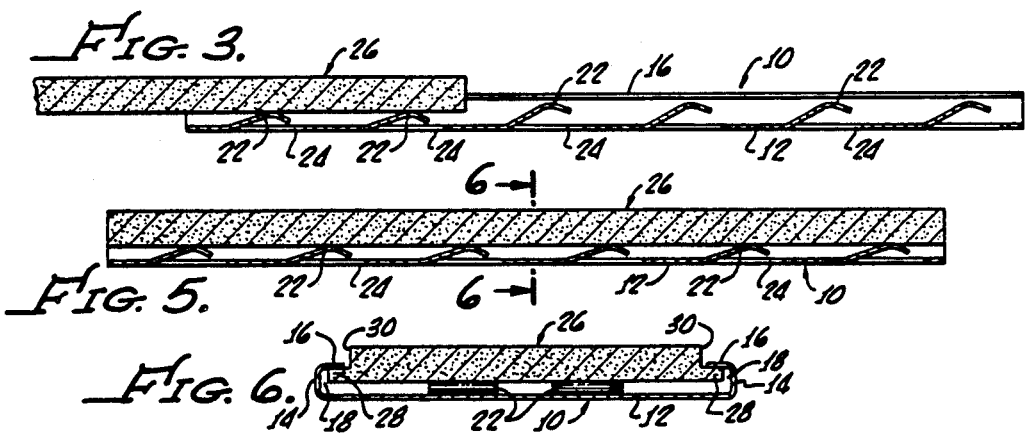

5,129,613

FIXTURE FOR ATTACHING CONTACT MATERIAL

FIELD OF THE INVENTION

This invention relates to the field of glass-making. In one of its more particular aspects this invention relates to a fixture for holding contact materials used in the glass container industry. In another of its more particular aspects this invention relates to the combination of a fixture and a contact wear material specially adapted for use in the fixture.

BACKGROUND OF THE INVENTION

Hot glass, especially when formed into various shapes in the manufacture of glass containers, is susceptible to being damaged by contact with glass processing equipment. Most of the equipment with which hot glass comes in contact in the hot end process area of the glass container industry during the process of manufacturing containers such as glass bottles is fabricated from metallic materials such as steel. Recently, the utilization of non-metallic contact materials such as graphite at various points in the hot end process area has, to a large extent, eliminated this problem. Damage to containers being manufactured has been greatly reduced by the use of various non-metallic contact materials.

Such contact materials generally require periodic replacement. Because of the need for replacement and because the typical contact material is not easily machined without using special equipment, it has been found expedient to design fixtures for holding such contact materials securely during use and from which the contact materials can be easily removed when replacement is required.

SUMMARY OF THE INVENTION

The present invention provides a fixture for holding a solid, rigid contact material firmly and releasibly. The fixture is designed in such a way that it is capable of receiving and holding a piece of contact material without requiring permanent attachment of the contact material to the fixture, thus facilitating removal and replacement of the contact material.

The fixture of the present invention comprises a substantially flat member having side edges which are formed into twin longitudinal inwardly facing U-shaped channels, the tops of which are substantially parallel to the bottom of the member, which contains a plurality of upwardly extending resilient projections. In a preferred embodiment the resilient projections constitute a set of formed tabs integral with the bottom of the member, positioned between the channels, and having a substantially smooth convex upper surface. The resilient projections are designed to exert an upward force upon a piece of contact material inserted into the channels of the fixture and to hold it securely against the tops of the channels. In an especially preferred embodiment, the formed tabs are so oriented that the piece of contact material held within the fixture can be inserted or removed from either end of the fixture.

The fixture of the present invention is intended for use with any piece of contact material which will fit within the channels of the fixture. However, it will be appreciated that the upper edges of the channels will extend above the surface of the contact material. Where it is desired that the surface of the contact material extend above the upper edges of the channels, a particular configuration of contact material can be used. The configuration which will best serve this purpose is a tee-section, with the crossbar of the tee fitting within the channels and the leg of the tee protruding above the upper edges of the channels.

BRIEF DESCRIPTION OF THE DRAWINGS

The invention will be more readily understood by reference to the accompanying drawings, wherein like numerals refer to like elements, and in which:

FIG. 1 is a perspective view of the fixture of the present invention and a piece of contact material, especially designed for use with the fixture, shown separately.

FIG. 2 is a plan view of the fixture with a piece of contact material partly inserted into the fixture.

FIG. 3 is a cross-section along line 3—3 of FIG. 2.

FIG. 4 a perspective view of the fixture and contact material, showing the contact material fully inserted into the fixture.

FIG. 5 is a cross-section along line 5—5 of FIG. 4.

FIG. 6 is a cross-section along line 6—6 of FIG. 5.

DESCRIPTION OF THE PREFERRED EMBODIMENTS

Referring to FIG. 1, which depicts the fixture of this invention and a piece of contact material of a specified configuration for inserting into the fixture, the numeral 10 represents the empty fixture, which has a base 12, sidewalls 14, and top rails 16 which are substantially parallel to base 12. Top rails 16, with sidewalls 14 and base 12, form twin channels 18 adapted for insertion of a piece of contact material. Base 12 contains apertures 20 which are designed to be used in anchoring the fixture to a piece of equipment on which it is used. Base 12 also contains a plurality of formed spring tabs 22 which extend at one end from base 12 at an acute angle and are free at the other end. Spring tabs 22 extend from base 12 and curve downwardly to present a convex upper surface over gaps 24 in base 12. A single gap 24 corresponds to an individual spring tab 22. The piece of contact material 26 is in the form of a tee section, the crossbar 28 being of dimensions to fit within twin channels 18 of fixture 10, with the leg 30 of the tee extending above top rails 16. FIG. 1 shows spring tabs 22 in their relaxed position. FIG. 2 shows spring tabs 22 in the same position and shows gaps 24 between the free ends of spring tabs 22 and base 12. FIG. 3 shows the piece of contact material 26 partly inserted into fixture 10 and particularly shows that the force exerted upon spring tabs 22 upon insertion of contact material 26 forces them into a position where they are pressed downwardly towards base 12 of fixture 10. In FIG. 3 the four spring tabs shown to the right are in their relaxed state whereas the two spring tabs shown at the left of FIG. 3 are compressed by contact material 26. FIG. 5 shows all of the spring tabs 22 in their compressed state. FIGS. 4 and 6 show the relationship between the contact material 26 and the fixture 10 when contact material 26 is fully inserted into fixture 10.

In use, contact material 26 is inserted into fixture 10 in a manner such that crossbar 28 of contact material 26 is fitted within twin channels 18. As contact material 26 is inserted into fixture 10 in the direction shown by the arrow 32 in FIG. 2, contact material 26 depresses spring tabs 22, which exert an upward force against the base of contact material 26 forcing it against the lower side of rails 16. The upward pressure of spring tabs 22 holds contact material 26 securely within fixture 10 yet permits easy removal when desired. The particular configuration of spring tabs 22 shown in FIGS. 1, 2, 3, and 5 enables contact material 26 to be inserted or removed from either end of fixture 10.

The fixture of this invention is particularly useful with graphite contact materials. However, it may be used with any ceramic, composite or other material having the desired thermal conductivity, hardness or other properties. One particular material that has achieved wide use in hot glass contact applications is GLASSMATE ® contact material, which is available from Poco Graphite, Inc., Decatur, Texas.

Materials of construction for the fixture of the present invention are not critical. The preferred fixture material is steel. However, other materials can be used as well. For example, it is possible to use various alloys or plastic materials having the desired strength and resiliency characteristics.

The fixture of the present invention can be used as a universal attachment bracket or in sweep-out fixtures or transfer paddles. In fact, the fixture can be used in any application in the hot end production of glass containers where it is desired to minimize checking and to reduce the incidence of mechanical contact damage to containers.

While particular embodiments of the invention have been described, it will be understood, of course, that the invention is not limited thereto, since many obvious modifications can be made. It is intended to include any such modifications as will fall within the scope of the appended claims.

We claim:

1. A fixture for use in the hot end production of glass containers for firmly and releasably holding a solid, rigid graphite contact material having a working surface for contacting hot glass, to minimize checking and to reduce the incidence of mechanical damage due to contact of hot glass with metallic surfaces, which comprises a base, a pair of sidewalls extending upwardly from said base, and a pair of top rails extending inwardly from the top of said sidewalls a distance sufficient to provide, with said base and said sidewalls, a pair of inwardly facing U-shaped channels which holds said contact material therebetween, the area between said channels being open to expose said working surface, said base containing a plurality of resilient tab members extending upwardly from said base, having a convex upper surface and oriented parallel to said channels, to enable the insertion or removal of said contact material from either end of the fixture.

2. A fixture according to claim 1 wherein said tab members extend upwardly from said base at an acute angle.

3. A fixture according to claim 1 wherein said tab members extend upwardly from said base at an acute angle and bend downwardly so as to present said convex upper surface.

4. A fixture according to claim 1 wherein said tab members have a first straight portion extending from said base and a second downwardly curing portion extending from said first straight portion.

5. A fixture according to claim 1 wherein said base contains a plurality of apertures for anchoring to a piece of equipment in the hot end production of glass containers.

6. A fixture according to claim 1 wherein said base contains a plurality of gaps, each gap corresponding to a tab member.

7. A fixture according to claim 1 wherein said base contains a plurality of gaps corresponding to said plurality of resilient tab members, each gap being positioned below each corresponding tab member.

8. A combination, for use in the hot end production of glass containers, of a fixture for holding a solid, rigid contact material firmly and releasably, and a solid, rigid contact material, which comprises:

a fixture having a base, a pair of sidewalls extending upwardly from said base, and a pair of top rails extending inwardly from the top of said sidewalls a distance sufficient to provide, with said base and said sidewalls, a pair of inwardly facing U-shaped channels for holding said contact material, the area between said channels being open to expose said working surface, said base containing a plurality of resilient tab members extending upwardly from said base, having a convex upper surface and oriented parallel to said channels to enable the insertion or removal of said contact material from either end of the fixture; and a solid, rigid graphite contact material having a working surface for contacting hot glass to minimize checking and to reduce the incidence of mechanical damage to hot glass due to contact of hot glass with metallic surfaces, and adapted to fit between said U-shaped channels and to exert a downward pressure upon said resilient tab members upon insertion of said contact material between said U-shaped channels;

said resilient tab members forcing the edges of the upper surface of said contact material between said U-shaped channels;

said resilient tab members forcing the edges of the upper surface of said contact material against the lower surface of said top rails to hold said contact material firmly and releasably within said fixture.

9. A combination according to claim 8 wherein said contact material has a cross-section in the form of a tee.

10. A combination according to claim 8 wherein said contact material has a cross-section in the form of a tee, the ends of the crossarm of the tee fitting within said U-shaped channels, and the leg of the tee extending substantially the entire width of the area between said top rails.

11. A combination according to claim 8 wherein said contact material has a cross-section in the form of a tee, the ends of the crossarm of the tee fitting within said U-shaped channels, and the leg of the tee extending beyond the tops of said rails.

* * * * *